(12) United States Patent
Iwao (10) Patent No.: US 9,114,697 B2
(45) Date of Patent: Aug. 25, 2015

(54) HYDRAULIC CIRCUIT FOR VEHICLE, VEHICLE EQUIPPED WITH SAME, AND CONTROL METHOD THEREFOR

(71) Applicant: ISUZU MOTORS LIMITED, Tokyo (JP)

(72) Inventor: Nobuyuki Iwao, Yokohama (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/394,117

(22) PCT Filed: Mar. 25, 2013

(86) PCT No.: PCT/JP2013/058619

§ 371 (c)(1),
(2) Date: Oct. 13, 2014

(87) PCT Pub. No.: WO2013/161479

PCT Pub. Date: Oct. 31, 2013

(65) Prior Publication Data

US 2015/0122564 A1    May 7, 2015

(30) Foreign Application Priority Data

Apr. 27, 2012  (JP) ................................. 2012-103290

(51) Int. Cl.
*B60K 6/00*    (2007.10)
*B60K 6/12*    (2006.01)
(Continued)

(52) U.S. Cl.
CPC ... *B60K 6/12* (2013.01); *B62D 5/07* (2013.01); *F15B 3/00* (2013.01); *F16H 61/0031* (2013.01);
(Continued)

(58) Field of Classification Search
CPC .......................................................... B60K 6/00
USPC ................................................ 180/165, 305
See application file for complete search history.

(56) References Cited

U.S. PATENT DOCUMENTS 3,911,679 A * 10/1975 Matthews ........................ 60/413
4,002,220 A *  1/1977 Wible ............................ 180/421
(Continued)

FOREIGN PATENT DOCUMENTS

JP      63-312267       12/1988
JP        9-2303         1/1997
(Continued)

OTHER PUBLICATIONS

Abstract of JP 63-312267.
(Continued)

*Primary Examiner* — John Walters
*Assistant Examiner* — James Triggs
(74) *Attorney, Agent, or Firm* — Staas & Halsey LLP (57) ABSTRACT

In a hydraulic circuit for a vehicle including an electric pump power steering system (EHPS), a hydraulic pressure supply system including a cylinder to store a second hydraulic pressure while a vehicle is traveling and supply the stored second hydraulic pressure to a clutch circuit as a third hydraulic pressure when being supplied with hydraulic pressure after storing the second hydraulic pressure. The hydraulic circuit also includes a connecting path to connect, at the start of the vehicle, the cylinder and the EHPS system to allow a first hydraulic pressure to be supplied to the cylinder by drive of a motor. It is therefore possible to reduce electric power consumed during idling stop mode and shorten a recovery time from the idling stop mode.

6 Claims, 4 Drawing Sheets

(51) Int. Cl.
    *B62D 5/07*         (2006.01)
    *F15B 3/00*         (2006.01)
    *F16H 61/00*      (2006.01)

(52) U.S. Cl.
    CPC . *F15B 2211/20576* (2013.01); *F15B 2211/505* (2013.01); *F15B 2211/7142* (2013.01); *F16H 2061/0034* (2013.01); *F16H 2312/14* (2013.01)

(56) References Cited

U.S. PATENT DOCUMENTS

| | | | | |
|---|---|---|---|---|
| 4,100,739 A | * | 7/1978 | Shaffer | 60/413 |
| 6,198,988 B1 | * | 3/2001 | Tseng | 701/1 |
| 7,082,358 B2 | * | 7/2006 | Sugo | 701/34.3 |
| 7,096,107 B2 | * | 8/2006 | Michi et al. | 701/70 |

FOREIGN PATENT DOCUMENTS

| | | |
|---|---|---|
| JP | 2005-271640 | 10/2005 |
| JP | 2010-248964 | 11/2010 |
| JP | 2010-281432 | 12/2010 |

OTHER PUBLICATIONS

International Search Report mailed Jun. 18, 2013, in corresponding International Patent Application No. PCT/JP2013/058619.

\* cited by examiner

HYDRAULIC CIRCUIT FOR VEHICLE, VEHICLE EQUIPPED WITH SAME, AND CONTROL METHOD THEREFOR

CROSS-REFERENCE TO RELATED APPLICATIONS

This application is a U.S. National Stage Application, which claims the benefit under 35 U.S.C. §371 of PCT International Patent Application No. PCT/JP2013/058619, filed Mar. 25, 2013, which claims the foreign priority benefit under 35 U.S.C. §119 of Japanese Patent Application No. 2012-103290, filed Apr. 27, 2012, the contents of which are incorporated herein by reference.

TECHNICAL FIELD

The present invention relates to: a hydraulic circuit for a vehicle which includes a power steering system configured to supply hydraulic pressure with a hydraulic pump driven by an electric motor, and a hydraulic pressure supply system configured to supply hydraulic pressure to a transmission that uses the hydraulic pressure; a vehicle; and a method of controlling the same.

BACKGROUND ART

In recent years, various types of auxiliary systems are provided in vehicles to implement smooth driving of the vehicles and reduce the fuel economy thereof. One of such auxiliary systems is a power steering system. The power steering system enables comfortable driving of a vehicle and makes the operation thereof easy and appropriate.

The power steering system assists steering operation with a motor (an electric motor) to improve the fuel economy of vehicles. As the power steering system driven by the motor, vehicles are normally equipped with a device including an electric power steering system (hereinafter, referred to as an EPS system) (see Patent Literature 1, for example). Heavy vehicles, which cannot be equipped with the EPS system, are often equipped with an electric pump power steering system (hereinafter, referred to as an EHPS system).

However, equipment of the EPS or EHPS system causes problems of deterioration of the fuel economy resources due to electric power consumption for separately driving the electric motor and deterioration of the mountability to vehicles.

On the other hand, vehicles are increasingly equipped with an idling stop system (hereinafter, referred to as an ISS) as a technique to improve the fuel economy. However, in vehicles equipped with transmissions that use hydraulic pressure, such as automatic transmissions (AT), automated manual transmissions (AMT), or continuously variable transmissions (CVT), the engine is stopped by the ISS, and hydraulic pressure cannot be supplied to the transmission that uses hydraulic pressure while the engine is in idling stop mode.

Until the supply of hydraulic pressure is started after the engine starts, it takes about one second, and hydraulic pressure cannot be obtained just after the start of the engine. It is therefore necessary to supply hydraulic pressure to the transmission that uses hydraulic pressure to ensure driving force instantaneously after the engine is recovered from the idling stop mode.

Accordingly, there is a system to supply stand-by hydraulic pressure to the transmission that uses hydraulic pressure by using an electric pump during idling stop mode. This system can quickly ensure the driving force at the start from the idling stop mode by using the electric pump to supply stand-by hydraulic pressure to the transmission which is not supplied with hydraulic pressure from a normal hydraulic pressure supply system because of the stop of the engine while the ISS is in operation, that is, during idling stop mode.

However, the aforementioned system to supply the stand-by hydraulic pressure needs to be separately provided with the electric pump and has a problem of deterioration of the mountability to the vehicle. Moreover, there is also a problem that operating the system to supply the stand-by hydraulic pressure during idling stop mode increases the electric power consumption during idling stop mode.

Figure 4:
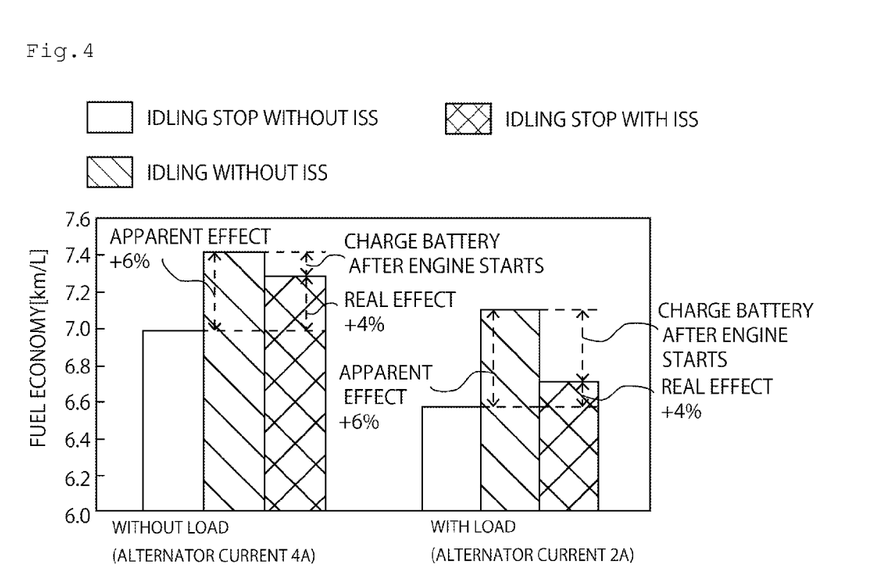
FIG. 4 is a graph representing electric power consumption during idling stop mode.

According to a graph showing the influence on electric power consumption during idling in FIG. 4, when a large amount of electric power is consumed during the idling stop mode, the amount of power generated by an alternator increases in order to charge the battery after the engine is restarted. This increases the load on the engine and increases the fuel consumption, thus reducing the real effect by the ISS.

That is, the ISS, which is mounted in order to improve the fuel economy, causes a problem that driving force cannot be obtained instantaneously after the engine is restarted. When the system to supply stand-by hydraulic pressure to the transmission that uses hydraulic pressure is mounted in order to solve the above problem, current of about 3.0 to 4.0 A is required while the vehicle is in idling stop mode, thus causing another problem of reduction of the effect on improving the fuel economy.

Figure 5:
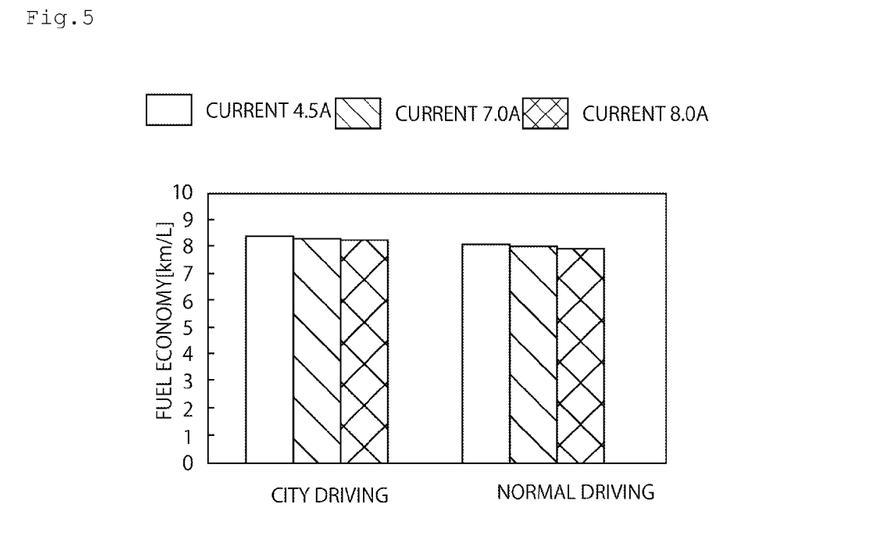
FIG. 5 is a graph representing an influence of electric powers of an alternator and a battery on the fuel economy.

Accordingly, when a vehicle is equipped with both the EHPS system and the system to supply stand-by hydraulic pressure, the amount of current is increased by about 4.0 to 6.0 A in total while the vehicle is in the idling stop mode. Here, according to a graph representing the influence of electric powers of the alternator and battery in FIG. 5, when the amounts of current of the alternator and battery are increased by 1 A, the fuel economy deteriorates by about 0.5 to 0.7%. Accordingly, when the both systems are provided on a vehicle, as represented in FIG. 4, the fuel economy reduction effect of 3 to 7% is reduced, and the effect of the ISS can be canceled in the worst case. Accordingly, it is necessary to minimize the amount of current while the vehicle is in the idling stop mode as much as possible in order not to reduce the fuel economy reduction effect obtained by equipment with the ISS.

As described above, in order to equip a vehicle with the auxiliary system, it is necessary to carefully consider the problems of deterioration of the mountability to the vehicle and deterioration of fuel economy due to reduction of fuel resources by the electric power consumption increased.

PRIOR ART DOCUMENT

Patent Document

Patent Document 1: Japanese Patent Laid-open publication No. 2005-271640

SUMMARY OF THE INVENTION

The present invention is made in the light of the aforementioned problems, and an object of the present invention is to provide: a hydraulic circuit for a vehicle which uses a power steering system supplying hydraulic pressure with an electric motor and a hydraulic pressure supply system supplying hydraulic pressure to at least a driving force transmitting device and is capable of reducing electric power consumed during idling stop mode and shortening recovery time from the idling stop mode; a vehicle equipped with the hydraulic circuit for a vehicle; and a method of controlling the same.

A hydraulic circuit for a vehicle of the present invention to solve the aforementioned problem is a hydraulic circuit for a vehicle, including: a power steering system including a first hydraulic pump configured to supply a first hydraulic pressure to a steering assistance device that assists steering performance of a steering, and an electric motor configured to operate the first hydraulic pump; and a hydraulic pressure supply system including a second hydraulic pump configured to supply a second hydraulic pressure to at least a driving force transmitting device, in which the hydraulic pressure supply system includes a hydraulic pressure storage device configured to store the second hydraulic pressure while the vehicle is traveling and supply the stored second hydraulic pressure to at least the driving force transmitting device when the hydraulic pressure storage device is supplied with hydraulic pressure after storing the second hydraulic pressure, and the hydraulic circuit for the vehicle includes a connecting path configured such that, at the start of the vehicle, the connecting path connects the hydraulic pressure storage device and the power steering system to allow the first hydraulic pressure to be supplied to the hydraulic pressure storage device by drive of the electric motor.

According to the aforementioned configuration, hydraulic pressure can be supplied to at least the driving force transmitting device (a clutch, for example) with the first hydraulic pump driven by the electric motor of the power steering system before the second hydraulic pump starts or until the second hydraulic pressure is supplied from the second hydraulic pump. This can shorten the recovery time from the idling stop mode even when the electric motor is stopped during the idling stop mode for the purpose of reducing the electric power consumption.

The first hydraulic pump of the power steering system is used to supply the first hydraulic pressure to the power steering system and supply the stored second hydraulic pressure to the driving force transmitting device at the recovery time from the idling stop mode. Accordingly, the electric motor and pump used to supply the stand-by hydraulic pressure during idling stop mode are unnecessary. It is therefore possible to reduce the electric power consumption during the idling stop mode and improve the mountability to the vehicle, thus reducing the cost.

The above-described hydraulic circuit for a vehicle may further include a controller configured to stop the electric motor at the process of bringing an internal combustion engine into an idling stop mode and drive the electric motor at the process of starting the internal combustion engine from the idling stop mode, and may include a check valve configured such that, in the process of supplying the second hydraulic pressure stored by the hydraulic pressure storage device to the driving force transmitting device, the check valve prevents the stored second hydraulic pressure from being supplied to other than the driving force transmitting device. According to the configuration, the oil is fed to only the driving force transmitting device at the recovery time from the idling stop mode. This can minimize the amount of oil. Moreover, since the oil is fed to only the driving force transmitting device at the start, the first hydraulic pressure used in the power steering system and the amount of current for driving an electric motor to supply the first hydraulic pressure can be minimized.

The recovery time from the idling stop mode can be shortened by a configuration in which the second hydraulic pump is also driven during the idling stop mode. However, the hydraulic pressure supply system using a large amount of oil uses a large amount of current during the idling stop mode. According to the configuration, the electric motor is stopped during the idling stop mode and is driven at the recovery time from the idling stop mode to supply the first hydraulic pressure to the hydraulic pressure storage device from the first hydraulic pump, and the hydraulic pressure storage device supplies the stored second hydraulic pressure to the driving force transmitting device. This can reduce an increase in electric power consumption during the idling stop mode, thus reducing the battery load and improving the fuel economy.

In addition, in the above-described hydraulic circuit for a vehicle, the hydraulic pressure storage device may be composed of a cylinder, and the connecting path may be provided with a changeover valve configured to shut off communication between the first hydraulic pump and the hydraulic pressure storage device while the second hydraulic pressure is being supplied from the second hydraulic pump and causes the first hydraulic pump and the hydraulic pressure storage device to communicate with each other while the second hydraulic pressure is not supplied from the second hydraulic pump. According to this configuration, the flow of the hydraulic pressure when the vehicle is traveling, when the vehicle is in the idling stop mode, and when the vehicle is being recovered from the idling stop mode, can be controlled by hydraulic pressure supplied to each system. Accordingly, the controller can provide the aforementioned operational effects with easy control that controls only the time to drive the electric motor.

Moreover, a vehicle to solve the aforementioned problem is a vehicle including: an idling stop system; and a hydraulic circuit for the vehicle including a power steering system including a first hydraulic pump configured to supply a first hydraulic pressure to a steering assistance device that assists steering performance of a steering, and an electric motor configured to operate the first hydraulic pump, and a hydraulic pressure supply system including a second hydraulic pump which is configured to supply a second hydraulic pressure to at least a driving force transmitting device. In the vehicle, the hydraulic pressure supply system includes a hydraulic pressure storage device which is configured to store the second hydraulic pressure before an internal combustion engine is stopped by the idling stop system and supply the stored second hydraulic pressure to at least the driving force transmitting device when the hydraulic pressure storage device is supplied with hydraulic pressure after storing the second hydraulic pressure, and the hydraulic circuit for the vehicle includes a connecting path configured such that, at the process of starting the internal combustion engine stopped by the idling stop system, the connecting path connects the hydraulic pressure storage device and the power steering system to allow the first hydraulic pressure to be supplied to the hydraulic pressure storage device by drive of the electric motor.

According to the above-described configuration, the system to shorten the recovery time from idling stop mode can be implemented by a system composed of the power steering system and hydraulic pressure supply system connected to each other. Accordingly, the electric power consumption during the idling stop mode can be reduced, and the electric motor, pump, and controller can be shared, thus improving the mountability to the vehicle and reducing the cost.

Furthermore, a method of controlling a vehicle to solve the aforementioned problem is a method of controlling a vehicle including: an idling stop system; and a hydraulic circuit for the vehicle including a power steering system including a first hydraulic pump configured to supply a first hydraulic pressure to a steering assistance device that assists steering performance of a steering; and a hydraulic pressure supply system including a second hydraulic pump configured to supply a second hydraulic pressure to at least a driving force transmitting device, the method including: storing the second hydraulic pressure in a hydraulic pressure storage device provided in the hydraulic pressure supply system before the idling stop system stops an internal combustion engine; stopping an electric motor while the internal combustion engine is stopped by the idling stop system; and at the process of starting the internal combustion engine stopped by the idling stop system, operating the electric motor to supply the first hydraulic pressure to the hydraulic pressure storage device and supplying the second hydraulic pressure stored in the hydraulic pressure storage device to the driving force transmitting device.

According to the aforementioned method, at the recovery time from the idling stop mode, the driving force transmitting device can be supplied with hydraulic pressure using the first hydraulic pressure pump driven by the electric motor. This eliminates the need for electric power used to supply hydraulic pressure to the driving force transmitting device during the idling stop mode. Accordingly, the electric power consumption during the idling stop mode can be reduced, and the recovery time from the idling stop mode can be shortened.

According to the present invention, by using the power steering system supplying hydraulic pressure with the electric motor and the hydraulic pressure supply system supplying hydraulic pressure to at least the driving force transmitting device, the electric power consumption during the idling stop mode can be reduced, and the recovery time from the idling stop mode can be shortened. Moreover, the mountability to the vehicle can be improved, and the cost can be reduced.

DETAILED DESCRIPTION

Hereinafter, a description is given of a hydraulic circuit for a vehicle, a vehicle, and a method of controlling the same, of an embodiment according to the present invention with reference to the drawings. This embodiment is described by using, by way of example, a front-engine rear-wheel drive (hereinafter, referred to as FR) vehicle as a type of rear-wheel drive vehicles in which rear wheels are driven among the front and rear wheels. However, the present invention is not limited to FR vehicles and is applicable to mid-engine rear-wheel drive (MR) vehicles or rear-engine rear-wheel drive (RR) vehicles. Moreover, the present invention is not limited to rear-wheel drive vehicles and is applicable to front-wheel drive vehicles such as front-engine front-wheel drive (FF) vehicles, for example.

Figure 1:
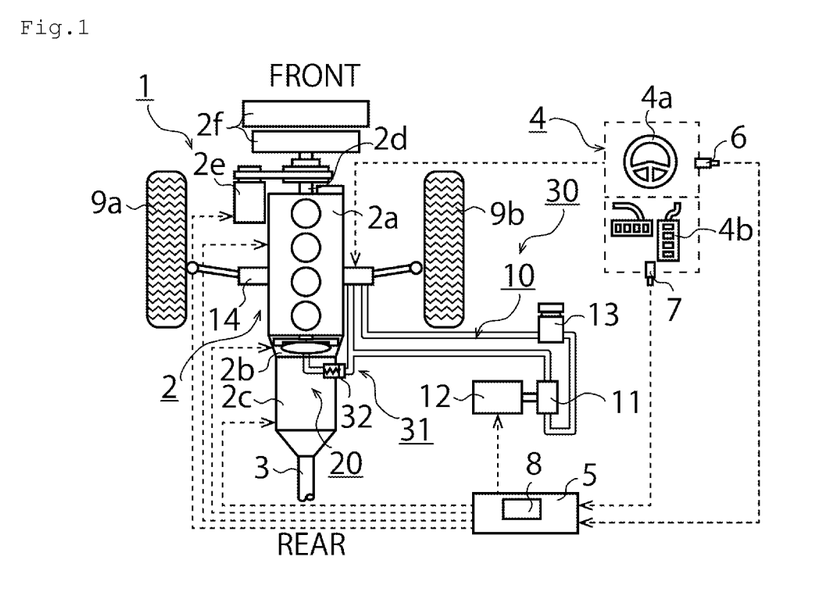
FIG. 1 is a schematic view illustrating a vehicle equipped with a hydraulic circuit for a vehicle of an embodiment according to the present invention.

First, a description is given of a vehicle equipped with a hydraulic circuit for a vehicle of the embodiment according to the present invention with reference to FIG. 1. Here, FIG. 1 illustrates the vehicle with the front thereof up and the back thereof down. The vehicle 1 travels with not-shown rear wheels as driving wheels by transmitting driving force generated by a power plant 2, which includes an engine (an internal combustion engine) 2a, a clutch (a driving force transmitting device) 2b, a transmission (a transmission device) 2c, a crankshaft 2d, an alternator (a power generator) 2e, and a cooling device (a radiator, a fan, or the like) 2f, to a driving shaft 3.

The vehicle 1 includes an operation device 4, an ECU (a controller) 5 called an engine control unit, a steering angle sensor 6, and an accelerator sensor 7. The operation device 4 includes a steering wheel (also referred to as a steering or a handle) 4a and a foot pedal (an accelerator pedal, a brake pedal, a clutch pedal, and the like) 4b. The ECU 5 is a microcontroller which uses information from the operation device 4 and each sensor 6, 7 to integrally perform electrical control handling control of the power plant 2 through an electrical circuit.

In the embodiment, the ECU 5 is provided with an idling stop system (hereinafter, referred to as an ISS) 8 and performs such a control that stops the engine 2a based on a change in vehicle speed sensed by the accelerator sensor 7 and restarts the engine 2a by detecting starting operation of the operation device 4.

In addition to the aforementioned configuration, the vehicle 1 of the embodiment according to the present invention further includes an EHPS system (an electric pump power steering system) 10, a hydraulic pressure supply system 20, and a vehicular hydraulic circuit 30. The EHPS system 10 is liked with the steering wheel 4a to steer front wheels 9a and 9b. The hydraulic pressure supply system 20 supplies hydraulic pressure to the devices that use hydraulic pressure, such as the power plant 2. The vehicular hydraulic circuit 30 is composed of the EHPS system 10 and hydraulic pressure supply system 20 connected to each other.

Figure 2:
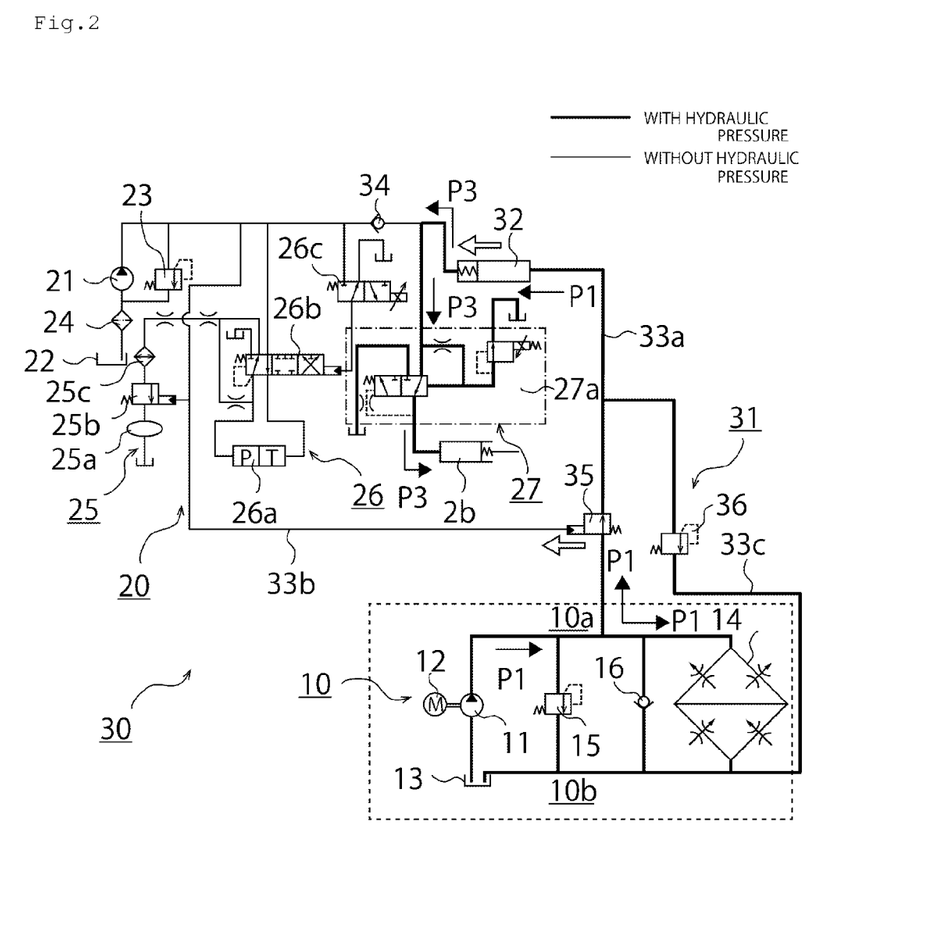
FIG. 2 is a fluid circuit diagram illustrating the hydraulic circuit for a vehicle illustrated in FIG. 1, showing the state thereof at the start from idling stop mode.
Figure 3:
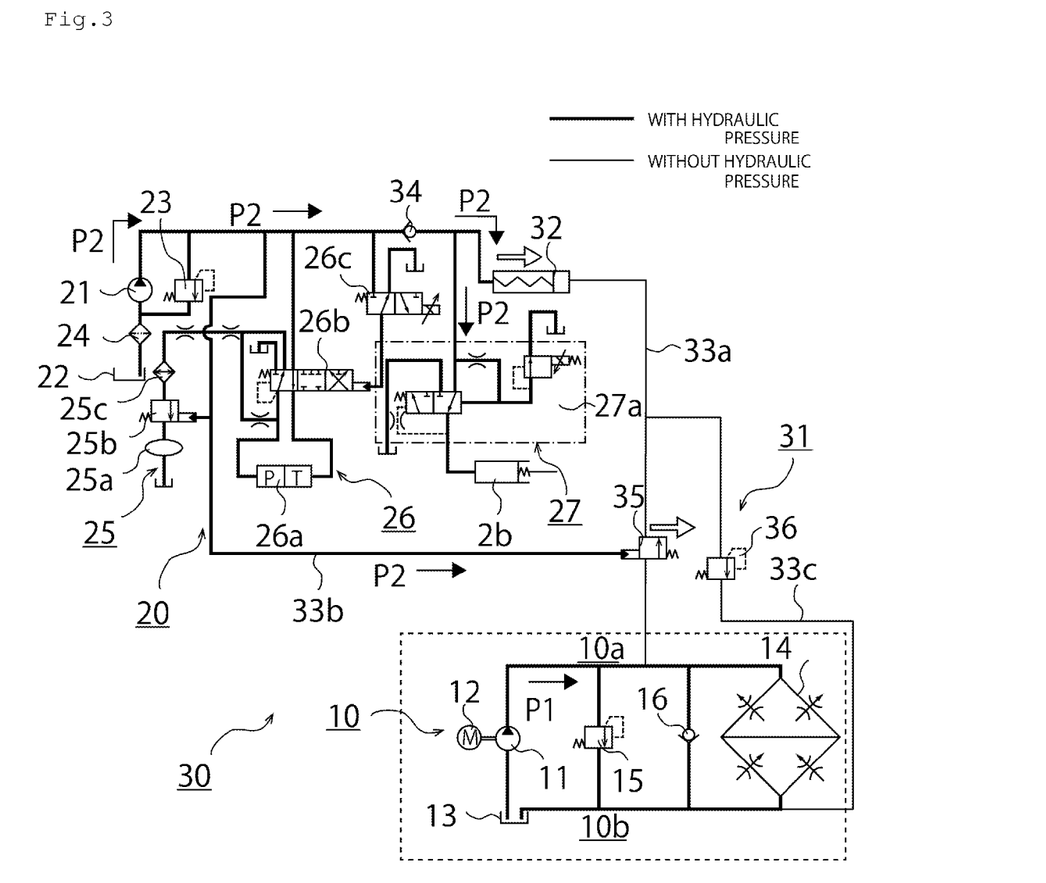
FIG. 3 is a fluid circuit diagram illustrating the hydraulic circuit for a vehicle illustrated in FIG. 1, showing the state thereof during traveling.

The vehicular hydraulic circuit 30 including the EHPS system 10 and the hydraulic pressure supply system 20 is described with reference to FIGS. 2 and 3. FIG. 2 illustrates the vehicle 1 which is starting from the idling stop mode, and FIG. 3 illustrates the vehicle 1 which is normally traveling. For easy understanding of the flow of hydraulic pressure in each system, hydraulic pressure supplied by a first hydraulic pump 11 is indicated by a first hydraulic pressure P1, hydraulic pressure supplied by a second hydraulic pump 21 is indicated by a second hydraulic pressure P2, and hydraulic pressure stored in a cylinder 32 is indicated by a third hydraulic pressure P3.

The EHPS system 10 includes the first hydraulic pump 11, the motor (the electric motor) 12, a reservoir tank 13, a power steering (a steering assistance device) 14 and further includes a relief valve (a line pressure control valve) 15 and a check valve 16. The EHPS system 10 only needs to operate the first hydraulic pump 11 and supply the first hydraulic pressure P1 to the power steering 14 by driving the motor 12 and is not limited to the aforementioned configuration.

According to the EHPS system 10, driving of the vehicle 1 can be made comfortable and appropriate by the EHPS system 10, and drive of the motor 12 is controlled by ECU 5, so that a necessary amount of first hydraulic pressure P1 can be supplied when needed. The fuel economy can be therefore improved.

The hydraulic pressure supply system 20 only needs to be a device which includes the second hydraulic pump 21 driven by the engine 2a, an oil tank 22, a relief valve (a line pressure control valve) 23, and an oil filter 24 and supplies hydraulic pressure to at least one of the devices that use hydraulic pressure such as a driving force transmitting device (a clutch, a transmission device, or the like), a cooling device, and a vehicle stop device.

As an example thereof, in the embodiment, the hydraulic pressure supply system 20 includes an oil cooler circuit 25, a fluid coupling circuit 26, and a clutch circuit 27. The oil cooler circuit 25 includes an oil cooler 25a, a cooler bypass circuit 25b, and a cooling unit 25c. The fluid coupling circuit 26 includes a fluid coupling 26a, a lock-up control valve 26b, and a lock-up control valve 26c provided with a lock-up solenoid. The clutch circuit 27 includes a clutch 2b and a linear solenoid valve 27a for clutch control.

The vehicular hydraulic circuit 30 of the present invention includes a stand-by hydraulic system 31 which connects the aforementioned EHPS system 10 and hydraulic pressure supply system 20 and transmits driving force immediately after the vehicle 1 is started from the idling stop mode, or shortens recovery time from the idling stop mode.

The stand-by hydraulic system 31 includes the cylinder (a hydraulic pressure storage device) 32, hydraulic tubes 33a to 33c, a check valve 34, a line cut valve (a changeover valve) 35, and a relief valve 36.

Specifically, the cylinder 32 provided in the hydraulic pressure supply system 20 and a high pressure-side circuit 10a of the EHPS system 10 are connected by the hydraulic tube (a connecting path) 33a. The cylinder 32 is a device which is provided in the hydraulic pressure supply system 20 to store and supply hydraulic pressure. The cylinder 32 stores the second hydraulic pressure while the second hydraulic pump 21 is operating and supplying the second hydraulic pressure P2 and supplies the stored second hydraulic pressure P3 as the third hydraulic pressure when being supplied with the first hydraulic pressure P1. The amount of oil which can be stored in the cylinder 32 can be arbitrarily set and is preferably set enough for connection of the clutch 2b.

The cylinder 32 can utilize a cylinder of a brake caliper which is rarely used these days because vehicles are provided with a parking brake.

The check valve 34 provided in the hydraulic pressure supply system 20 is a device configured to differentiate hydraulic pressure supplied to the clutch 2b of the clutch circuit 27 between when the second hydraulic pump 21 operates to supply the second hydraulic pressure P2 and when the second hydraulic pump 21 does not operate and cannot supply the second hydraulic pressure P2, that is, between when the stand-by hydraulic system 31 is operating and when not operating.

In the process of supplying the third hydraulic pressure P3 to the clutch 2b by operation of the stand-by hydraulic system 31, the check valve 34, which is provided in the hydraulic pressure supply system 20, prevents the third hydraulic pressure P3 from being supplied to devices other than the clutch 2b. The third hydraulic pressure P3 can be thereby minimized. It is therefore possible to reduce the capacity of the cylinder 32 and lower the first hydraulic pressure P1 used to operate the cylinder 32.

The line cut valve 35 provided in the hydraulic tube 33a shuts off the communication between the EHPS system 10 and hydraulic pressure supply system 20 while being supplied with the second hydraulic pressure P2 from the second hydraulic pump 21 as illustrated in FIG. 3. Moreover, the line cut valve 35 is connected to the hydraulic tube 33b connected to the second hydraulic pump 21 so that the EHPS system 10 and hydraulic pressure supply system 20 communicate with each other while the line cut valve 35 is not supplied with the second hydraulic pressure P2 from the second hydraulic pump 21.

The line cut valve 35 is a so-called hydraulic pilot changeover valve and includes a housing, a main spool, at least one return spring, and a plate. The line cut valve 35 connects the EHPS system 10 and hydraulic pressure supply system 20, and the main spool is operated by the second hydraulic pressure P2. When being supplied with the second hydraulic pressure P2, the line cut valve 35 supplies the first hydraulic pressure P1 to the cylinder 32. When the line cut valve 35 is not supplied with the second hydraulic pressure P2, the line cut valve 35 is kept off by energization force of the return spring to shut off the communication between the EHPS system 10 and hydraulic pressure supply system 20.

The relief valve 36, which is provided in the EHPS system 10, is a device configured to determine supply pressure of the cylinder 32.

Next, the operation of the vehicle 1 of the embodiment according to the present invention is described with reference to FIGS. 2 and 3. As illustrated in FIG. 3, when the vehicle 1 is normally traveling, the ECU 5 drives the motor 12 to operate the first hydraulic pump 11. The first hydraulic pressure P1 is supplied to the power steering 14 to make driving of the traveling vehicle 1 comfortable and appropriate. In this process, the magnitude of the supplied first hydraulic pressure P1 can be controlled by the rotation speed of the motor 12. By controlling the motor 12 based on the supplied amount calculated from the information detected by the steering angle sensor 6, the electric power consumption by the EHPS system 10 can be reduced, and the fuel economy can be improved.

On the other hand, while the vehicle 1 is normally traveling, the second hydraulic pump 21 is driven by the engine 2a to operate. The second hydraulic pressure P2 is then supplied to the oil cooler circuit 25, fluid coupling circuit 26, and clutch circuit 27. In this process, the check valve 34 is opened to supply the second hydraulic pressure P2 to the clutch circuit 27. At the same time, the second hydraulic pressure P2 is also supplied to the cylinder 32. Accordingly, the cylinder 32 stores the second hydraulic pressure P2 while the vehicle 1 is traveling, that is, while the second hydraulic pressure P2 is being supplied by the second hydraulic pump 21.

In this process, the second hydraulic pressure P2 is also supplied to the line cut valve 35. The line cut valve 35 is closed by the second hydraulic pressure P2 to shut off the communication between the EHPS system 10 and hydraulic pressure supply system 20. Accordingly, the first hydraulic pressure P1 is not supplied to the cylinder 32 even if the first hydraulic pump 11 of the EHPS system 10 operates, thus preventing the EHPS system 10 and hydraulic pressure supply system 20 from interfering with each other.

When the ISS 8 determines that the vehicle 1 is stopped based on the information detected by the accelerator sensor 7, the ECU 5 stops the engine 2a. When the engine 2a is stopped, the second hydraulic pump 21 stops, and the supply of the second hydraulic pressure P2 to the hydraulic pressure supply system 20 is then stopped.

At the same time, the ECU 5 also stops the motor 12. When the motor 12 is stopped, the first hydraulic pump 11 stops. Specifically, when the vehicle 1 is in the idling stop mode, the steering operation is not required, and it is therefore unnecessary to supply the first hydraulic pressure P1 to the power steering 14, and the motor 12 can be stopped. The electric power consumed by the motor 12 can be thereby reduced.

Next, when the ECU 5 or ISS 8 determines from the information detected by the accelerator sensor 7 that the vehicle 1 is starting from the idling stop mode, the ECU 5 then drives the motor 12. The motor 12 is driven when the vehicle 1 transits from the idling stop mode to starting operation and preferably before the engine 2a starts.

When the motor 12 is driven, the first hydraulic pump 11 operates to supply the first hydraulic pressure P1 to the power steering 14 as illustrated in FIG. 2. At the same time, the line cut valve 35 is opened because the engine 2a has not started yet or the second hydraulic pressure P2 is not supplied to the line cut valve 35 from the second hydraulic pump 21 even after the engine 2a is started.

When the light cut valve 35 is opened, the EHPS system 10 communicates with the cylinder 32 to supply the first hydraulic pressure P1 to the cylinder 32. The cylinder 32 supplied with the first hydraulic pressure P1 supplies the hydraulic pressure P3 stored in the cylinder 32 to the clutch circuit 27. In this process, the check valve 34 is closed by the feeding hydraulic pressure of the stored hydraulic pressure P3 of the cylinder 32, and the stored hydraulic pressure P3 is supplied to only the clutch circuit 27.

According to the aforementioned operation, in the process of recovery from the idling stop mode, before the engine 2a starts or just after the engine 2a starts but before the second hydraulic pressure P2 is supplied to the clutch circuit 27, the hydraulic pressure P3 stored in the cylinder 32 can be supplied to the clutch circuit 27 by using the first hydraulic pump 11 driven by the motor 12. The vehicle 1 can be therefore recovered from the idling stop mode within a short period of time.

This eliminates the need to supply hydraulic pressure to the clutch circuit 27 during the idling stop mode in preparation for recovery from the idling stop mode. Accordingly, another motor is unnecessary, and the motor 12 can be stopped during the idling stop mode, thus reducing the electric power consumed during the idling stop mode.

Moreover, since the aforementioned operational effect can be obtained by connecting the EHPS system 10 and hydraulic pressure supply system 20 to form the stand-by hydraulic pressure system 31, the system to shorten the time taken for the vehicle 1 to recover from the idling stop mode can be implemented only by the first hydraulic pump 11 and motor 12. It is therefore possible to improve the mountability to the vehicle 1. Moreover, the control thereof can be performed by easy control that stops the motor 12 during the idling stop mode and drives the motor 12 at the start from the idling stop mode.

Moreover, in the process of recovery from the idling stop mode, the check valve 34 is closed to supply the stored hydraulic pressure P3 to only the clutch circuit 27. Accordingly, the amount of oil fed for the first hydraulic pressure P1 supplied to the cylinder 32 can be minimized. Moreover, the oil is fed within a short period of time until the engine 2a starts to supply the second hydraulic pressure P2 from the second hydraulic pump 21. Accordingly, the oil can be fed without increasing the rotational speed of the motor 12 used to operate the first hydraulic pump 11, and the operation time of the motor 12 can be minimized.

In conjunction with the control that stops the motor 12 during the idling stop mode, it is possible to reduce the electric power consumed during the idling stop mode and in the process of recovery from the idling stop mode, thus reducing the load on the battery and improving the fuel economy.

As for the configuration of the vehicle 1, for example, the engine 2a may be a diesel engine, gasoline engine, or electric motor, and the transmission 2c may be a continuously variable transmission (CVT). The vehicle 1 may be a hybrid car provided with an electric motor independently of the engine 2a.

The embodiment employs the second hydraulic pump 21 driven by the engine 2a. However, the present invention is not limited to such a configuration and may be applied to a hydraulic pressure supply system in which the second hydraulic pump 21 is operated by drive of the electric motor also during traveling, for example.

According to the hydraulic circuit for a vehicle of the present invention, the power steering system and hydraulic pressure supply system are supplied with hydraulic pressure while the vehicle is traveling. When the vehicle is in the idling stop mode, the systems are not supplied with hydraulic pressure, and when the vehicle is restarted from the idling stop mode, hydraulic pressure can be supplied to the driving force transmitting device within a short period of time using an electric motor. Accordingly, electric power consumed during the idling stop mode can be reduced, and the vehicle 1 can quickly recover from the idling stop mode. The present invention is therefore applicable to vehicles equipped with idling stop systems.

The invention claimed is:

1. A hydraulic circuit for a vehicle, comprising:
a power steering system including a first hydraulic pump configured to supply a first hydraulic pressure to a steering assistance device that assists steering performance of a steering, and an electric motor configured to operate the first hydraulic pump; and
a hydraulic pressure supply system including a second hydraulic pump configured to supply a second hydraulic pressure to at least a driving force transmitting device, wherein
the hydraulic pressure supply system includes a hydraulic pressure storage device configured to store the second hydraulic pressure while the vehicle is traveling and supply the stored second hydraulic pressure to at least the driving force transmitting device when the hydraulic pressure storage device is supplied with hydraulic pressure after storing the second hydraulic pressure, and
the hydraulic circuit for the vehicle includes a connecting path configured such that, at the start of the vehicle, the connecting path connects the hydraulic pressure storage device and the power steering system to allow the first hydraulic pressure to be supplied to the hydraulic pressure storage device by drive of the electric motor.

2. The hydraulic circuit for a vehicle according to claim 1, further comprising
a controller configured to stop the electric motor at the process of bringing an internal combustion engine into an idling stop mode and drive the electric motor at the process of starting the internal combustion engine from the idling stop mode, wherein
the hydraulic pressure supply system includes a check valve configured such that, in the process of supplying the second hydraulic pressure stored by the hydraulic pressure storage device to the driving force transmitting device, the check valve prevents the stored second hydraulic pressure from being supplied to other than the driving force transmitting device.

3. The hydraulic circuit for a vehicle according to claim 1, wherein
the hydraulic pressure storage device is composed of a cylinder, and
the connecting path is provided with a changeover valve configured to shut off communication between the first hydraulic pump and the hydraulic pressure storage device while the second hydraulic pressure is being supplied from the second hydraulic pump and causes the first hydraulic pump and the hydraulic pressure storage device to communicate with each other while the second hydraulic pressure is not supplied from the second hydraulic pump.

4. A vehicle, comprising:
an idling stop system;
a hydraulic circuit for the vehicle, including
  a power steering system including a first hydraulic pump configured to supply a first hydraulic pressure to a steering assistance device that assists steering performance of a steering, and an electric motor configured to operate the first hydraulic pump, and
  a hydraulic pressure supply system including a second hydraulic pump which is configured to supply a second hydraulic pressure to at least a driving force transmitting device, wherein
the hydraulic pressure supply system includes a hydraulic pressure storage device which is configured to store the second hydraulic pressure before an internal combustion engine is stopped by the idling stop system and supply the stored second hydraulic pressure to at least the driving force transmitting device when the hydraulic pressure storage device is supplied with hydraulic pressure after storing the second hydraulic pressure, and
the hydraulic circuit for the vehicle includes a connecting path configured such that, at the process of starting the internal combustion engine stopped by the idling stop system, the connecting path connects the hydraulic pressure storage device and the power steering system to allow the first hydraulic pressure to be supplied to the hydraulic pressure storage device by drive of the electric motor.

5. A method of controlling a vehicle including:
an idling stop system;
a hydraulic circuit for the vehicle including
  a power steering system including a first hydraulic pump configured to supply a first hydraulic pressure to a steering assistance device that assists steering performance of a steering; and
  a hydraulic pressure supply system including a second hydraulic pump configured to supply a second hydraulic pressure to at least a driving force transmitting device, the method comprising:
storing the second hydraulic pressure in a hydraulic pressure storage device provided in the hydraulic pressure supply system before the idling stop system stops an internal combustion engine;
stopping an electric motor while the internal combustion engine is stopped by the idling stop system; and
at the process of starting the internal combustion engine stopped by the idling stop system, operating the electric motor to supply the first hydraulic pressure to the hydraulic pressure storage device and supplying the second hydraulic pressure stored in the hydraulic pressure storage device to the driving force transmitting device.

6. The hydraulic circuit for a vehicle according to claim 2, wherein
  the hydraulic pressure storage device is composed of a cylinder, and
  the connecting path is provided with a changeover valve configured to shut off communication between the first hydraulic pump and the hydraulic pressure storage device while the second hydraulic pressure is being supplied from the second hydraulic pump and causes the first hydraulic pump and the hydraulic pressure storage device to communicate with each other while the second hydraulic pressure is not supplied from the second hydraulic pump.

* * * * *